US005819218A

United States Patent [19]

Hayata et al.

[11] Patent Number: 5,819,218

[45] Date of Patent: Oct. 6, 1998

[54] VOICE ENCODER WITH A FUNCTION OF UPDATING A BACKGROUND NOISE

[76] Inventors: Toshihiro Hayata; Yoshihiro Unno, both of c/o NEC Corporation, 7-1, Shiba 5-chome, Minato-ku, Tokyo, Japan

[21] Appl. No.: 794,138

[22] Filed: Feb. 3, 1997

Related U.S. Application Data

[63] Continuation of Ser. No. 158,699, Nov. 29, 1993.

[30] Foreign Application Priority Data

Nov. 27, 1992 [JP] Japan .......................................... 317639

[51] Int. Cl.[6] .......................................................... G01L 9/00

[52] U.S. Cl. ......................... 704/233; 704/208; 704/215; 704/226; 704/227

[58] Field of Search ................................. 395/2.17, 2.19, 395/2.23, 2.24, 2.35, 2.36, 2.42; 704/208, 210, 214, 215, 226, 227, 233

[56] References Cited

U.S. PATENT DOCUMENTS

| | | | |
|---|---|---|---|
| 4,817,157 | 3/1989 | Gerson | 381/40 |
| 4,918,734 | 4/1990 | Muramatsu et al. | 381/46 |
| 5,293,450 | 3/1994 | Kane et al. | 395/2.35 |
| 5,410,632 | 4/1995 | Hong et al. | 395/2.42 |
| 5,475,712 | 12/1995 | Sasaki | 375/241 |
| 5,490,231 | 2/1996 | Kane et al. | 395/2.35 |
| 5,537,509 | 7/1996 | Swaminathan et al. | 385/2.37 |
| 5,539,858 | 7/1996 | Sasaki et al. | 395/2.21 |
| 5,555,546 | 9/1996 | Matsumoto et al. | 375/244 |
| 5,630,016 | 5/1997 | Swaminathan et al. | 395/2.37 |

FOREIGN PATENT DOCUMENTS

| | | |
|---|---|---|
| 018256 | 1/1980 | European Pat. Off. . |
| 309869 | 4/1989 | European Pat. Off. . |
| 459363 | 12/1991 | European Pat. Off. . |
| 13516 | 7/1993 | WIPO . |

OTHER PUBLICATIONS

*GSM Full-rate Speech Transcoding*, (ETSI/PT 12, GSM Recommendation 06.10, Jan. 1990).

*Discontinuous Transmission (DTx) for Full-rate Speech Traffic Channels* (ETSI/PT 12 GSM Recommendation 06.31, Jan. 1990).

*Primary Examiner*—David R. Hudspeth
*Assistant Examiner*—Vijay B. Chawan
*Attorney, Agent, or Firm*—Ostrolenk, Faber, Gerb & Soffen, LLP

[57] ABSTRACT

A voice encoder which pauses outputting codewords in accordance with the absence of voice activity. An input aural signal is divided into frames and inputted to the voice encoder. The voice encoder has a voice activity detection circuit for determining at each frame whether voice activity is absent or present, a voice encoding circuit, a background noise update judging circuit for detecting a change in the characteristics of the input aural signal, and a control circuit. If the absence of voice activity is detected, the control circuit causes the frame at that time to be encoded as a background noise frame, and then pauses the operation of the voice encoding circuit. If the presence of voice activity is detected, the operation of the voice encoding circuit is resumed. Furthermore, if the voice encoding circuit is not in operation when a change in the characteristics of the input aural signal is detected, the control circuit causes the voice encoding circuit to encode the frame at that time as a background noise frame and then again stop the operation of the voice encoding circuit.

16 Claims, 3 Drawing Sheets

VOICE ENCODER WITH A FUNCTION OF UPDATING A BACKGROUND NOISE

This is a continuation of application Ser. No. 08/158,699 filed on Nov. 29, 1993.

BACKGROUND OF THE INVENTION

1. Field of the Invention

The present invention relates to a voice encoder.

2. Description of the Related Art

Various devices and apparatus have been proposed as voice encoders (voice-to-digital converters) that encode inputted aural signals. In the case of applying a voice encoder to a mobile radio communication system or a satellite communication system, reducing the amount of code while maintaining encoding quality is important for eliminating inefficiency or interference in the communication channel.

When taking as an object the encoding of human speech, a particular speaker in a conversation will obviously not be speaking at all times. Consequently, if coding is halted during the time a speaker is not actually speaking, the amount of encoding can be reduced. Furthermore, in a mobile radio communication terminal, a reduction in the consumption of electrical power can be achieved by halting encoding, enabling longer battery life. For example, in GSM (Global System for Mobile Communication) recommendations such as "GSM Full-rate Speech Transcoding," (ETSI/PT 12, GSM Recommendation 06.10, January 1990) and "Discontinuous Transmission (DTx) for Full-rate Speech Traffic Channels," (ETSI/PT 12, GSM Recommendation 06.31, January 1990), techniques are disclosed by which transmission devices on the mobile station side are not activated if there is no voice activity when encoding aural signals in communication between a mobile station and a base station.

FIG. 1 shows a block diagram of the composition of an example of a conventional voice encoder. This voice encoder 50 is composed of an input terminal 51 for inputting input aural signals for each frame, a synthetic filter coefficient calculation circuit 52 for calculating a synthetic filter coefficient for each frame, a frame energy calculation circuit 53 for calculating the frame energy value for each frame, a voice activity detecting circuit 54 for distinguishing whether or not there is voice activity in the current frame, a voice encoding circuit (voice-to-digital circuit) 55 for encoding the current frame based on the synthetic filter coefficient and the frame energy value, an output terminal 56 for outputting the coded result (codewords) of the voice encoding circuit 55, and a control circuit 57 that controls the overall operation of the voice encoder 50.

The input aural signal is an acoustic signal obtained by means of a handset, a microphone or the like, and includes not only the speaker's voice, but also background noise or sound during pauses in the speaker's voice. In this case, the presence of voice activity is a state in which the input aural signal includes the speaker's voice, and the absence of voice activity is a state in which the input aural signal does not include the speaker's voice. The coded signal outputted from the output terminal 56 is then transmitted by way of a communication channel 58 and demodulated by means of a voice decoder (digital-to-voice converter) 59 on the other speaker's side.

In the voice encoder 50, the voice activity detecting circuit 54 judges the absence or presence of voice activity at each of the frames. The absence of voice activity, i.e., a state in which the input aural signal is not the speaker's voice but rather background noise, is determined at the voice activity detecting circuit 54. If the information of absence of voice activity is inputted to the control circuit 57, then the control circuit 57 controls the voice encoding circuit 55, and after allowing encoding and transmitting of the frame at the time of determination, stops the output of the coded signal from the voice encoding circuit 55 until the presence of voice activity is determined. To the signal of the coded frame at the time the absence of voice activity was determined, a flag is added indicating that it is background noise. If it is here determined that voice activity is present, the voice encoding circuit 55 resumes encoding based on the synthetic filter coefficient and the frame energy value. Furthermore, although the absence of voice activity continues, a frame encoded as background noise is sent for the passage of each fixed time period $\Delta T$. Here, the fixed time $\Delta T$ can be termed the "continuous background noise time." While the absence of voice activity continues for a long, a coded signal is not transmitted from the voice encoder 50 to the voice decoder 59 during each time period of continuous background noise. Consequently, during the time period of continuous background noise, demodulated data is outputted at the voice decoder 59 based on the frame preceding the break in coded transmission, i.e., the frame to which a flag is affixed indicating that it is background noise. Specifically, the voice decoder 59 first demodulates frames that are transmitted as background noise, and during times of continuous background noise, it continues to demodulate while changing a portion of the code of the transmitted frame that is background noise. If a new frame of background noise is sent in accordance with the passage of time $\Delta T$ from the transmission of the previous frame of background noise, the voice decoder 59 updates the background noise based on the frame of background noise just sent from the voice encoder 50 and continues demodulating based on the updated background noise.

As explained above, in a voice encoder of the prior art, as long as it is continuously determined that voice activity is absent, a frame encoded as background noise is sent for the passage of each time period $\Delta T$ of continuous background noise, and when this is not the case (during a rest period), no coded data is outputted. Accordingly, at the voice decoder, the background noise is updated for each time period $\Delta T$ of continuous background noise, and during a rest period, demodulation is continued based on updated background noise. As a result, when the absence of voice activity is accompanied by a large variation in the input aural signal, the background noise will vary greatly for each time period of continuous background noise, and the aural signal outputted from the voice decoder will vary greatly in quality for each fixed time $\Delta T$, and this variation in sound quality will sound unnatural to the person on the receiving side.

SUMMARY OF THE INVENTION

A purpose of the present invention is to provide a voice encoder that will not cause an unnatural aural signal to be outputted from the voice decoder on the receiving side during a continued absence of voice activity.

The purpose of the present invention is achieved by a voice encoder having voice activity detection means for analyzing an input aural signal and judging whether voice activity is absent or present; voice encoding means for encoding the input aural signal; background noise update determining means for detecting a change in the characteristic of the input aural signal when voice activity is absent;

and control means for temporarily stopping the operation of the voice encoding means when the absence of voice activity is detected, and, when a change in the characteristics of the input aural signal is detected by the background noise update determining means, causing encoding of the input aural signal at that time as background noise data by means of the voice encoding means.

The purpose of the present invention is also achieved by a voice encoder having input means for inputting an input aural signal divided into frames; synthetic filter coefficient calculation means for analyzing the input aural signal and calculating a synthetic filter coefficient; frame energy calculation means for analyzing the input aural signal and calculating a frame energy value for each of the frame; voice activity detection means for determining whether voice activity is absent or present; voice encoding means for encoding the input aural signal frame by frame based on the synthetic filter coefficient and the frame energy value; background noise update determining means for detecting a change in the characteristics of the input aural signal when voice activity is absent; and control means for temporarily stopping the operation of the voice encoding means when the absence of voice activity is detected, and, when a change in the characteristics of the input aural signal is detected by the background noise update determining means, causing encoding of the input aural signal at that time as a background noise frame by means of the voice encoding means.

The above and other objects, features and advantages of the present invention will become apparent from the following description referring to the accompanying drawings which illustrate an example of a preferred embodiment of the present invention.

DESCRIPTION OF THE PREFERRED EMBODIMENTS

Figure 1:
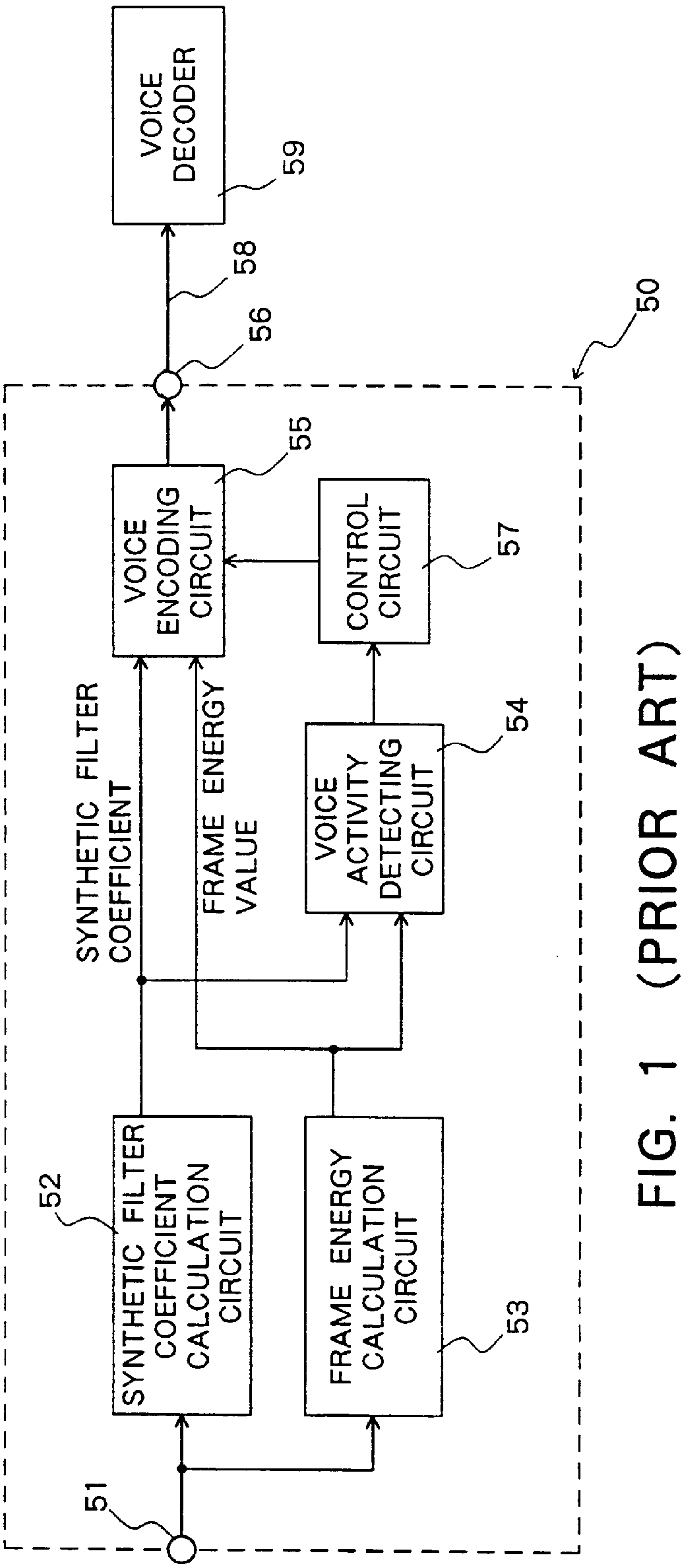
FIG. 1 (PRIOR ART)
FIG. 1 is a block diagram showing the composition of an example of a conventional voice encoder.
Figure 2:
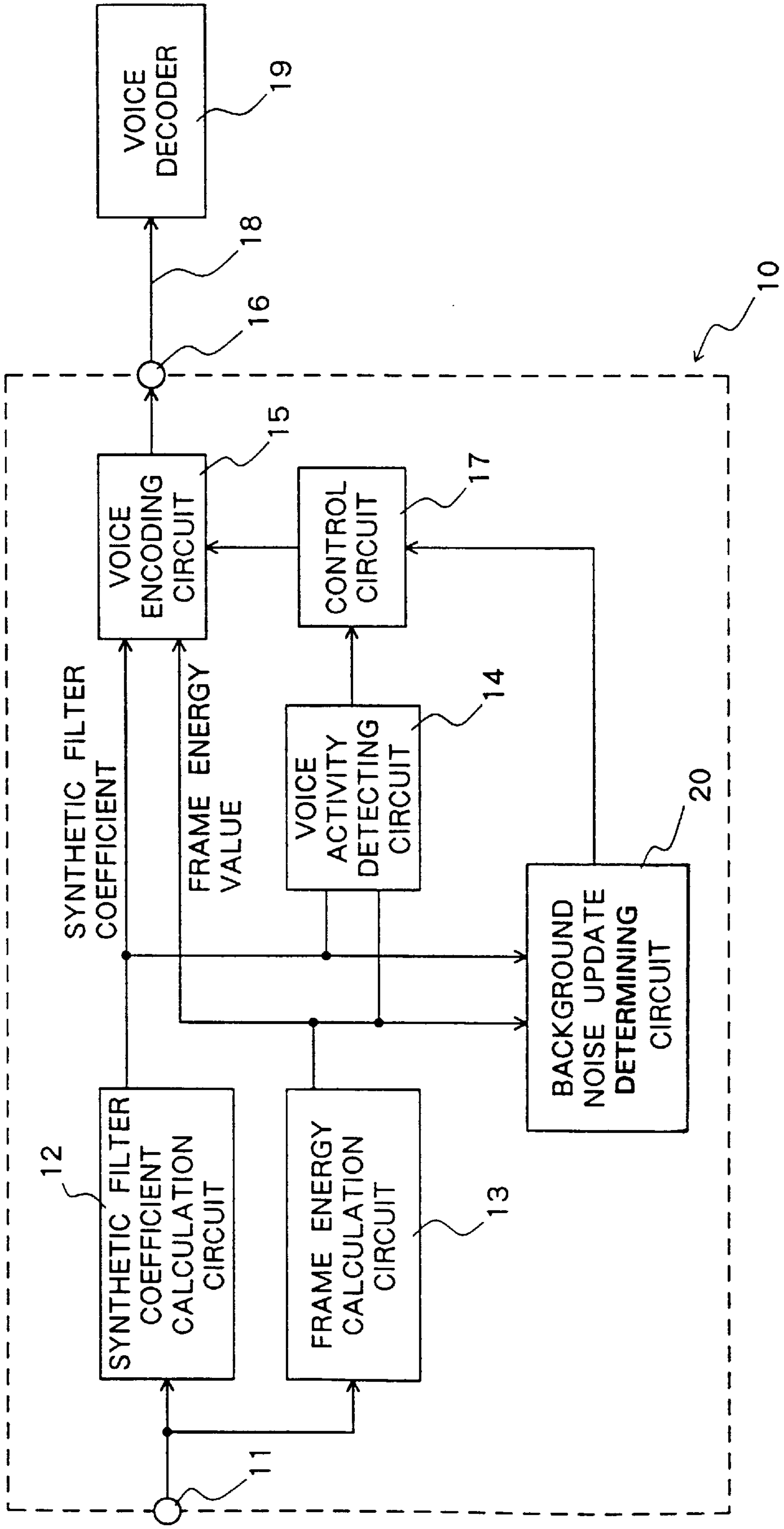
FIG. 2 is a block diagram showing the composition of an embodiment of the voice encoder of the present invention.

A preferred embodiment of the present invention will be described with reference to the drawings. In the voice encoder 10 shown in FIG. 2, an input aural signal divided into frames is inputted to an input terminal 11. A synthetic filter coefficient calculation circuit 12 that calculates a synthetic filter coefficient for each frame and a frame energy calculation circuit 13 that calculates a frame energy value for each frame are each connected to the input terminal 11. The method of calculating the synthetic filter coefficient can for example be a method based on LPC (Linear Prediction Coding). The calculated synthetic filter coefficient and frame energy value are both supplied to a voice activity detecting circuit 14, a voice encoding circuit 15, and a background noise update determining circuit 20.

The voice activity detecting circuit 14 determines whether voice activity is absent or present in the current frame based on the synthetic filter coefficient and the frame energy value. This judgment is carried out for each frame. The result of judgment of the voice activity detecting circuit 14 is outputted to the control circuit 17.

The voice encoding circuit 15 is for encoding the current frame using the synthetic filter coefficient and the frame energy value, and its operation is controlled by the control circuit 17 as will be explained below. The voice encoding method of the present embodiment can employ for example a RPE-LTP (Regular Pulse Excitation Long Term Predictor) method. The output of the voice encoding circuit 15, codewords, is outputted to the outside as the output of the voice encoder 10 by way of the output terminal 16. In the present embodiment, this voice encoder 10 is connected to a voice decoder 19 by way of a communication line 18.

The background noise update determining circuit 20 is for detecting whether or not there is variation or change in the characteristics of the input aural signal when voice activity is absent based on the synthetic filter coefficient and the frame energy value. The judgment result of the background noise update determining circuit 20 is outputted to the control circuit 17.

The control circuit 17 is structured so as to control the voice encoding circuit 15 as following manner. If the absence of voice activity is detected by the voice activity detecting circuit 14 when the voice encoding circuit 15 is in operation, the control circuit 17 causes the frame at that time to be encoded as a background noise frame and then temporarily stops the operation of the voice encoding circuit 15; and if the presence of voice activity is detected when the voice encoding circuit 15 is not in operation, the control circuit 17 causes the voice encoding circuit 15 to resume operation. Furthermore, if the voice encoding circuit 15 is not in operation when variation or change in the characteristics of the input aural signal is detected by the background noise update determining circuit 20, the control circuit 17 causes the voice encoding circuit 15 to encode the frame at that time as a background noise frame and then again stop the operation of the voice encoding circuit 15.

Here, a background noise frame is a frame produced by encoding an input aural signal when voice activity is absent, i.e., a frame of encoded background noise, and is a frame that indicates that encoding is to temporarily stop after output of the frame. Specifically, a background noise frame is composed of a postamble signal and the following encoded data. A postamble signal is a signal indicating that (1) the output of the voice encoder 10 is to be temporarily stopped because the voice activity has ceased, and (2) the data to be transmitted next is background noise.

The background noise update judging circuit 20 will next be described in further detail. The background noise update determining circuit 20 holds the synthetic filter coefficient and frame energy value of the previously transmitted background noise frame and compares the synthetic filter coefficient and frame energy value of the previously transmitted frame with the synthetic filter coefficient and frame energy value of the current frame. Here, the synthetic filter coefficient must first be explained.

The synthetic filter coefficient specifies the characteristics of the synthetic filter used in the coding of the aural signal, and generally, designates the spectrum characteristics of the corresponding synthetic filter. Various methods of comparing the two synthetic filter coefficients may be considered, but in the present embodiment, considering the spectral envelope of the synthetic filter corresponding to each synthetic filter coefficient, comparison is made according to values derived by integrating according to the frequency the absolute value of the difference in spectral intensity of the envelope of two synthetic filter for each frequency. In other words, the spectral envelope represented by the synthetic filter coefficient of the previously outputted background noise frame is $f_{pre}(v)$, and the spectral envelope represented by the synthetic filter coefficient of the current frame is $f_{curr}(v)$. Here, v is the frequency, and $f_1$ and $f_2$ are the lowest limit frequency and the highest limit frequency, respectively, of a frequency band. The integral value LD indicated by formula (1) below is referred to as "LPC distortion" in which |x| represents the absolute value of x.

$$LD = \int_{f_1}^{f_2} |f_{pre}(v) - f_{curr}(v)| dv \quad (1)$$

Figure 3:
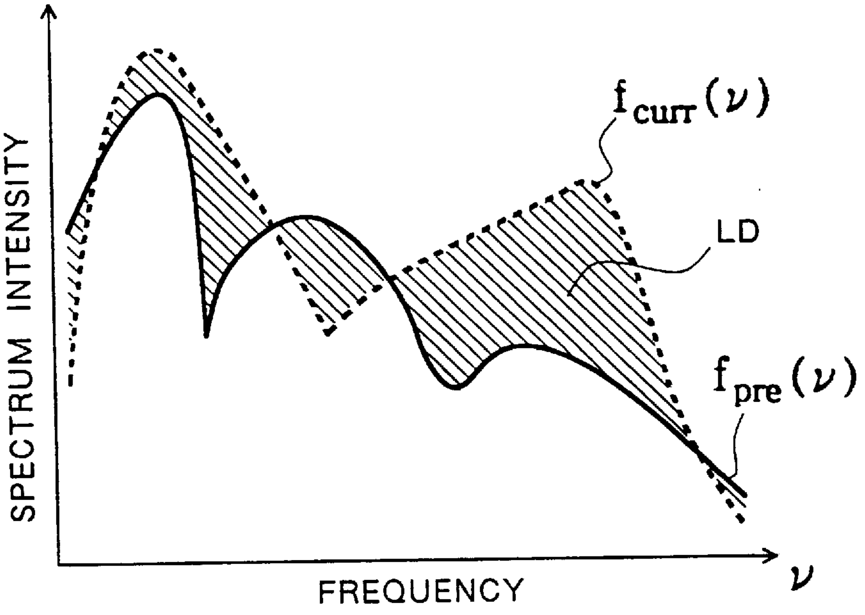
FIG. 3 is a characteristics graph showing a comparison of synthetic filter coefficients.

In FIG. 3, spectral envelope $f_{pre}(v)$ and $f_{curr}(v)$ are shown by a solid and a dotted line, respectively. The region enclosed by the solid and dotted lines, i.e., the area marked by diagonal lines, is the integral value LD.

Next, will be explained the principals for the judgment by the background noise update determining circuit 20. When the absence of voice activity continues and background noise is updated, (1) if there is a relatively large change in the signal intensity (frame energy) from the beginning to the end of updating, or (2) if there is a relatively large change in the tone quality of the aural signal from the beginning to the end of updating, it can be considered likely that the output at the voice decoder on the receiving side will sound unnatural. if the frame energy value of the current frame is $RO_{curr}$, the frame energy value of the previously transmitted background noise is $RO_{pre}$, the threshold value of the frame energy is $RO_{th}$, and the threshold value for the integral value (LPC distortion) LD is $LD_{th}$, the background noise update judging circuit 20 determines that a change or variation in the characteristics of the input aural signal occurred if at least one of the two formulae (2) and (3) is satisfied.

$$\left| \log\left(\frac{RO_{curr}}{RO_{pre}}\right) \right| > RO_{th} \quad (2)$$

$$|LD| > LD_{th} \quad (3)$$

Formula (2) is a condition for updating the background noise, before the difference between $RO_{pre}$ and $RO_{curr}$ becomes very great, in order to prevent sudden changes in the frame energy from the beginning to the end of updating. Rather than judging conditions based on a simple difference, condition judgment is performed using a logarithm because human perception possesses a logarithmic characteristic. Formula (3) is a condition to prevent sudden changes in the tone quality from the beginning to the end of updating. The threshold values $RO_{th}$ and $LD_{th}$ used in formulae (2) and (3) are parameters used for determining whether or not to forcibly update the background noise on the voice decoder side and can be appropriately set according to the sound quality on the receiving side or type of input aural signals.

Regarding the operation of this voice encoder 10, the voice activity detecting circuit 14 judges the absence or presence of voice activity at each of the frames, and when there is voice activity, the voice encoding circuit 15 carries on encoding of inputted frames, and the inputted frames are outputted from the output terminal 16. If voice activity is detected when the operation of the voice encoding circuit 15 is stopped due to the absence of voice activity, the operation of the voice encoding circuit 15 is resumed.

As to transition from the presence to the absence of voice activity, when the absence of voice activity is detected, the input aural signal at that time is encoded as a background noise frame and outputted, following which the voice encoding circuit 15 is stopped by the control circuit 17. While operation of the voice encoding digital circuit 15 is stopped, the background noise update judging circuit 20 monitors the synthetic filter coefficient and frame energy value of each frame, and when at least one of formulae (2) and (3) is satisfied, it is determined that a change has occurred in the characteristics of the input aural signal. When a change in the characteristic of the input aural signal has been detected, under the control of the control circuit 17, the voice encoding circuit 15 encodes and outputs the frame at that time as a background noise frame. The voice encoding circuit 15 then returns to a rest state, where it remains until voice activity is present or a change in the characteristics of the input aural signal is again detected. If neither formula (2) nor (3) is satisfied, the current frame is not encoded.

As explained above, in the present embodiment, if a change in the characteristics of the input aural signal is detected, background noise is forcibly updated, and consequently, it is possible to reduce unpleasantness (unnatural sound quality) due to sudden changes in background noise for the person on the voice decoder side.

The present invention allows a number of different embodiments. First, when a fixed time ΔT has elapsed since the last transmission of a background frame, the background noise can be updated regardless of the judgment made by the background noise update determining circuit 20. The fixed time period ΔT corresponds to continuous background noise time in the voice coder of the prior art.

In the embodiment described above, judgment was made using the ratio of $RO_{curr}$ to $RO_{pre}$ in formula (2), but judgment may also be made based on the difference between $RO_{pre}$ and $RO_{curr}$. In addition, when calculating integral value LD, it is possible to weight the spectral intensity according to the perceived characteristics or to carry out integration non-linearly. It is also possible to vary threshold values $RO_{th}$ and $LD_{th}$ according to the state of the synthetic filter coefficient or the frame energy value. Further, the background noise may be updated only when changes occur in both the synthetic filter coefficient and the frame energy value.

It is to be understood that variations and modifications of the voice encoder disclosed herein will be evident to those skilled in the art. It is intended that all such modifications and variations be included within the scope of the appended claims.

What is claimed is:

1. A voice encoder comprising:

voice activity detection means for analyzing an input aural signal and determining the presence or absence of voice activity;

voice encoding means for encoding the input aural signal;

background noise update determining means for detecting a change in the characteristic of the input aural signal when voice activity is absent; and control means for temporarily stopping operation of the voice encoding means when an absence in voice activity is detected, and when a change in the characteristics of the input aural signal is detected by the background noise update determining means, causing the voice encoding means to encode the input aural signal at that time as background noise data.

2. The voice encoder of claim 1, wherein the input aural signals are divided into frames and inputted to the voice encoding means, and encoding is carried out frame by frame.

3. The voice encoder of claim 2, wherein determination of the absence or presence of voice activity is carried out at each of the frames, and wherein operation of the voice encoding means is resumed if the presence of voice activity is determined when the operation of the voice encoding means is in a rest state.

4. The voice encoder of claim 1, wherein when the absence of voice activity is detected, operation of the voice encoding means is temporarily stopped after encoding the input aural signal at that time as background noise data.

5. The voice encoder of claim 4, wherein, the background noise data is outputted at predetermined time intervals while the absence of voice activity continues.

6. A voice encoder comprising:

input means for inputting an aural signal divided into frames;

synthetic filter coefficient calculation means for analyzing the input aural signal and calculating a synthetic filter coefficient;

frame energy calculation means for analyzing the input aural signal and calculating a frame energy value for each of the frames;

voice activity detection means for determining whether voice activity is absent or present;

voice encoding means for encoding the input aural signal frame-by-frame based on the synthetic filter coefficient and the frame energy value;

background noise update determining means for detecting a change in the characteristics of the input aural signal when voice activity is absent; and control means for temporarily stopping the operation of the voice encoding means when an absence of voice activity is detected, and when a change in the characteristics of the input aural signal is detected by the background noise update determining means, causing the voice encoding means to encode the input aural signal at that time as a background noise frame.

7. The voice encoder of claim 6, wherein the voice activity detection means determines whether voice activity is absent or present based on the synthetic filter coefficient and the frame energy value.

8. The voice encoder of claim 6, wherein the background noise update determining means detects a change in the characteristics of the input aural signal based on at least one of the synthetic filter coefficient and the frame energy value.

9. The voice encoder of claim 8, wherein the background noise update determining means compares a current frame and a previously outputted background noise frame, and determines that a change has occurred in the characteristics of the input aural signal if the change of at least one of the synthetic filter coefficient and the frame energy value exceeds a predetermined threshold value.

10. The voice encoder of claim 8, wherein a determination is made that a change has occurred in the input aural signal if the ratio of the frame energy value of the current frame to the frame energy value of the previously outputted background noise frame deviates from a predetermined range.

11. The voice encoder of claim 8, wherein it is judged that a change has occurred in the characteristics of the input aural signal if the area of the difference between the spectral characteristics shown by the synthetic filter coefficient of the current frame and the spectral characteristics shown by the synthetic filter coefficient of the previously outputted background noise frame exceeds a predetermined value.

12. The voice encoder of claim 6, wherein determination of the absence or presence of voice activity is carried out at each of the frames, and wherein operation of the voice encoding means is resumed if the presence of voice activity is determined when the operation of the voice encoding means is in a rest state.

13. The voice encoder of claim 6, wherein when the absence of voice activity is detected, the operation of the voice encoding means is temporarily stopped after encoding the input aural signal as the background noise frame at the time when an absence of voice activity is detected.

14. The voice encoder of claim 6, wherein, the background noise frame is outputted at predetermined time intervals while the absence of voice activity continues.

15. A voice encoder comprising:

a voice activity detection circuit for analyzing an input aural signal and determining the presence or absence of voice activity;

a voice encoding circuit for encoding the input aural signal;

a background noise update determining circuit for detecting a change in the characteristics of the input aural signal when voice activity is absent; and a control circuit for temporarily stopping operation of the voice encoding circuit when detecting an absence in voice activity, and when a change in the characteristics of the input aural signal is detected by the background noise update determining circuit, causing the voice encoding circuit to encode the input aural signal at that time as background noise data.

16. A voice encoder comprising:

input terminal for inputting an aural signal divided into frames;

synthetic filter coefficient calculation circuit for analyzing the input aural signal and calculating a synthetic filter coefficient;

frame energy calculation circuit for analyzing the input aural signal and calculating a frame energy value for each of the frames;

voice activity detecting circuit for determining whether voice activity is absent or present;

voice encoding circuit for encoding the input aural signal frame-by-frame based on the synthetic filter coefficient and the frame energy value;

background noise update determining circuit for detecting a change in the characteristics of the input aural signal when voice activity is absent; and control circuit for temporarily stopping the operation of the voice encoding circuit when it is detected that voice activity is absent, and when a change in the characteristics of the input aural signal is detected by the background noise update determination circuit, causing the voice encoding circuit to encode the input aural signal at that time as a background noise frame.

* * * * *

UNITED STATES PATENT AND TRADEMARK OFFICE
CERTIFICATE OF CORRECTION

PATENT NO. : 5,819,218

DATED : October 6, 1998

INVENTOR(S) : Toshihiro HAYATA et al.

It is certified that error appears in the above-indentified patent and that said Letters Patent is hereby corrected as shown below:

On the Title page of the patent:

At Item [73], insert name of Assignee as follows: --NEC Corporation--.

At Item [30], change Foreign Application Priority Data to read: --Nov. 27. 1992 [JP] Japan .........4-317639--.

Signed and Sealed this

Fifth Day of October, 1999

Attest:

Q. TODD DICKINSON

Attesting Officer

*Acting Commissioner of Patents and Trademarks*